US011858154B2

(12) United States Patent
Palero et al.

(10) Patent No.: US 11,858,154 B2
(45) Date of Patent: Jan. 2, 2024

(54) OPERATING A PERSONAL CARE DEVICE

(71) Applicant: KONINKLIJKE PHILIPS N.V., Eindhoven (NL)

(72) Inventors: Jonathan Alambra Palero, Waarle (NL); Martin Jurna, Den Bosch (NL); Ashoka Sathanur Visweswara, Amstelveen (NL); Vincentius Paulus Buil, Veldhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 865 days.

(21) Appl. No.: 16/485,242

(22) PCT Filed: Feb. 9, 2018

(86) PCT No.: PCT/EP2018/053238
§ 371 (c)(1),
(2) Date: Aug. 12, 2019

(87) PCT Pub. No.: WO2018/149738
PCT Pub. Date: Aug. 23, 2018

(65) Prior Publication Data

US 2019/0375121 A1 Dec. 12, 2019

(30) Foreign Application Priority Data

Feb. 20, 2017 (EP) .................................... 17156866

(51) Int. Cl.
*B26B 19/38* (2006.01)
*B26B 19/20* (2006.01)
(Continued)

(52) U.S. Cl.
CPC ............ *B26B 19/388* (2013.01); *B26B 19/20* (2013.01); *A45D 2026/008* (2013.01); *A45D 2044/007* (2013.01)

(58) Field of Classification Search
CPC ....... B26B 19/388; B26B 19/20; B26B 19/38; A45D 2026/008; A45D 2044/007; A45D 26/00; A45D 44/00
(Continued)

(56) References Cited

U.S. PATENT DOCUMENTS 5,331,472 A 7/1994 Rassman
6,533,774 B1 3/2003 Ota
(Continued)

FOREIGN PATENT DOCUMENTS

JP 2007260038 A * 10/2007
WO 2015/067484 5/2015
WO WO-2015067498 A1 * 5/2015 ........... B26B 19/388

OTHER PUBLICATIONS

International Search Report and the Written Opinion dated May 14, 2018 For International Application No. PGT/EP2018/053238 Filed Feb. 9, 2018.

(Continued)

*Primary Examiner* — Nhat Chieu Q Do

(57) ABSTRACT

There is provided a method for operating a personal care device. The method comprises obtaining, using an imaging device, image data relating to a portion of a body of a user; measuring, using the image data, a parameter relating to at least one hair growing from the portion of the body; and determining a position of the portion of the body on the body based on the measured parameter and a predetermined relation between the parameter and the position on the body. A personal care device, a personal care system and a machine-readable medium are also disclosed.

15 Claims, 4 Drawing Sheets

(51) Int. Cl.
*A45D 26/00* (2006.01)
*A45D 44/00* (2006.01)

(58) Field of Classification Search
USPC .......................................................... 606/133
See application file for complete search history.

(56) References Cited

U.S. PATENT DOCUMENTS

| | | | | |
|---|---|---|---|---|
| 8,744,192 | B2 | 6/2014 | Ortins | |
| 8,941,727 | B2 | 1/2015 | Rassman | |
| 2002/0103500 | A1* | 8/2002 | Gildenberg | A61B 34/30 606/187 |
| 2007/0106306 | A1* | 5/2007 | Bodduluri | A61B 34/70 606/133 |
| 2008/0228178 | A1 | 9/2008 | Van Hal | |
| 2008/0255548 | A1* | 10/2008 | Van Hal | A61B 18/203 606/2 |
| 2009/0036800 | A1 | 2/2009 | Rabin | |
| 2010/0186234 | A1* | 7/2010 | Binder | H04N 23/57 348/E5.022 |
| 2011/0130748 | A1 | 6/2011 | Kellogg | |
| 2014/0137883 | A1* | 5/2014 | Rothschild | B26B 19/388 132/200 |
| 2014/0320622 | A1* | 10/2014 | Binder | B26B 19/48 348/77 |
| 2015/0040934 | A1* | 2/2015 | Krenik | A45D 24/36 132/214 |
| 2015/0197016 | A1* | 7/2015 | Krenik | B26B 21/4081 83/13 |
| 2015/0217465 | A1* | 8/2015 | Krenik | B26B 19/388 700/90 |
| 2016/0163180 | A1 | 6/2016 | Chien | |
| 2016/0234465 | A1* | 8/2016 | Binder | H04N 23/63 |
| 2017/0032223 | A1* | 2/2017 | Zingaretti | A61B 5/7275 |

OTHER PUBLICATIONS

Xiao, et al: "Capacitive contact imaging for in-vivo hair and nail water content measurements" Household and Personal Care Today, vol. 10(5) Sep./Oct. 2015.

Otberg, et al: "Variations of hair follicle size and distribution in different body sites" The Journal of Investigative Dermatology, Jan. 2004, vol. 122, Issue 1, pp. 14-19.

* cited by examiner

OPERATING A PERSONAL CARE DEVICE

CROSS REFERENCE TO RELATED APPLICATIONS

This application is the U.S. National Phase application under 35 U.S.C. § 371 of International Application No. PCT/EP2018/053238 filed Feb. 9, 2018, published as WO 2018/149738 on Aug. 23, 2018, which claims the benefit of European Patent Application Number 17156866.0 filed Feb. 20, 2017. These applications are hereby incorporated by reference herein.

TECHNICAL FIELD OF THE INVENTION

The invention relates to a personal care device and a method for operating a personal care device. More particularly, the invention relates to determining a body part by operating the personal care device.

BACKGROUND TO THE INVENTION

Personal care devices are used to perform personal care activities on, for example, skin of a user. Such personal care activities include, but are not limited to, epilating, hair care activities, such as shaving and trimming, or massaging. While the user may know which part of his or her body is being treated by the personal care device, and may be able to tailor the application of the personal care accordingly, the device itself may function in a suboptimal manner for some parts of the body compared to others.

Furthermore, some personal care systems include cameras which are capable of capturing images of large portions of a user or their body, including, for example, their face. Since some personal care activities may be considered to be private or intimate in nature, it may be undesirable to use a system in which the camera is capable of capturing large images, particularly if the system is capable of connecting to, and transmitting data to and from, a network, such as the internet.

US 2016/163180 A1 discloses an electronic device for reminding a user when to shave. The device comprises a front camera to capture a facial image, a determination module to determine a cheek region and a beard region from the facial image, an extraction module to extract characteristic information of the cheek region and the beard region from the facial image, and a comparison module to compare the characteristic information of the cheek region and the beard region and to determine a difference value between the two regions. Upon determining that the difference value exceeds a predetermined threshold, a control module controls a reminding device to emit an alter to remind the user to shave.

WO 2015/067484 A1 discloses a hair cutting system comprising a hair cutting device and an imaging module remote from the hair cutting device. The imaging module is configured to generate information indicative of the position of the hair cutting device relative to the head of the user based on an image of the head of the user and the hair cutting device. A controller is configured to change an operating parameter of the hair cutting device, for example the remaining length of the cut hairs, in dependence on the information generated by the imaging module.

SUMMARY OF THE INVENTION

In order to operate in an optimal manner, it can be beneficial for a personal care device to identify its approximate position on the body of a user, for example by identifying the body part to which the personal care activity is being performed. Existing means for identifying a body part can be ineffective. Therefore, there is a desire for a more effective means for identifying the position of a personal care device on the body of a user, for example by identifying the body part of a user to which a personal care activity is being performed.

The inventors have realised that hairs of a user's body can be used to identify a body part on which the hairs are present and, therefore, to identify an approximate position of a personal care device on the body.

According to a first aspect, there is provided a method for operating a personal care device, the method comprising: obtaining, using an imaging device, image data relating to a portion of a body of a user to be acted upon by the personal care device; measuring, using the image data, a parameter relating to at least one hair growing from the portion of the body; and determining a position of the portion of the body on the body based on the measured parameter and a predetermined relation between the parameter and the position on the body. Since hairs are present on most body parts of a human's body, parameters of the hairs can be measured for different body parts and a relation between the parameter and the position on the body can be predetermined. By comparing the measured parameter with the predetermined relation, a location on the body can be identified. If the location of a personal care device is known, then that information can advantageously be used in a number of ways. For example, the personal care activity may be performed in a more efficient or effective manner, or the personal care device may be operated in a more efficient or effective way. Within the scope of the invention, determining or indicating, to the user, the position of the portion of the body on the body may comprise determining or indicating the part of the body wherein said portion of the body is present. Also within the scope of the invention, the predetermined relation between the parameter and the position on the body may be a predetermined relation between the parameter and specific parts of the body.

The method may further comprise performing a personal care activity to the body of the user. In some embodiments, the method may comprise, responsive to determining the position of the portion of the body on the body, causing the personal care device to perform an action.

The action may comprise at least one of i) indicating, to the user, the determined position of the portion of the body on the body, and ii) adjusting an operating parameter of the personal care device depending on the determined position of the portion of the body on the body. By adjusting an operating parameter of the personal care device, the performance of the device can be optimized for the particular portion of the body or body part to which the personal care activity is being performed.

In some embodiments, the parameter may comprise at least one of: a diameter of a shaft of the at least one hair, an orientation of the at least one hair relative to the body of the user, a pigment of the at least one hair.

In some embodiments, the parameter is measured for a plurality of hairs growing from the portion of the body. In this embodiment, the parameter may comprise at least one of: an area of the portion of the body to which the image data relates which is covered by the plurality of hairs, a sum of cross section areas of shafts of the plurality of hairs growing from the portion of the body, and a degree of uniformity of an orientation of the plurality of hairs relative to the portion of the body.

In some embodiments, the predetermined relation between the parameter and the position on the body may be stored in a lookup table or database. Within the scope of the invention, the lookup table or database may comprise a relation between the parameter and specific parts of the body, for example values of the parameter for a plurality of different parts of the body.

In some embodiments, the method may further comprise storing at least one of the image data, the measured parameter and the determined position of the portion of the body on the body in a storage device. The method may comprise transmitting at least one of the image data, the measured parameter and the determined position of the portion of the body on the body to a computing device. The transmitted data may be used to further improve the performance of the personal care activity or to obtain information about the user's performance and the quality of performance.

According to a second aspect, there is provided a personal care device comprising: a personal care element; an imaging device; and processing apparatus configured to perform the method according to the first aspect described above, wherein the processing apparatus is configured to perform the step of obtaining the image data using said imaging device.

The imaging device may comprise a device selected from a group comprising, but not limited to: an optical imaging device; a capacitive contact sensor; and an acoustic imaging device.

According to a third aspect, there is provided a personal care system comprising: a personal care device and a processing apparatus remote from the personal care device. The personal care device comprises: a personal care element; an imaging device configured to obtain image data relating to a portion of a body of a user to be treated by the personal care element; and a controller configured to control the personal care element and the imaging device. The processing apparatus is configured to measure, using the image data, a parameter relating to at least one hair growing from the portion of the body, and to determine a position of the portion of the body on the body based on the measured parameter and a predetermined relation between the parameter and the position on the body.

The processing apparatus is remote from the personal care device. In this way, processing of the image data may be performed separately, by a device such as a smartphone or a tablet computer, which can be used for additional purposes, such as to provide feedback to the user.

In some embodiments, the controller may be configured to: responsive to determining the position of the portion of the body on the body, control the personal care device to at least one of: i) indicate to the user the determined position of the portion of the body on the body; and ii) adjust an operating parameter of the personal care device depending on the determined position of the portion of the body on the body.

According to a fourth aspect, there is provided a machine-readable medium comprising instructions which, when executed by a processor, cause the processor to: obtain image data relating to a portion of a body of a user; measure, using the image data, a parameter relating to at least one hair growing from the portion of the body; and determine a position of the portion of the body on the body based on the measured parameter and a predetermined relation between the parameter and the position on the body.

Other advantageous features will become apparent from the following description.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE PREFERRED EMBODIMENTS

It can be desirable to be able to determine a position or location of a personal care device on a body of a user by using data acquired by the device itself.

Figure 1:
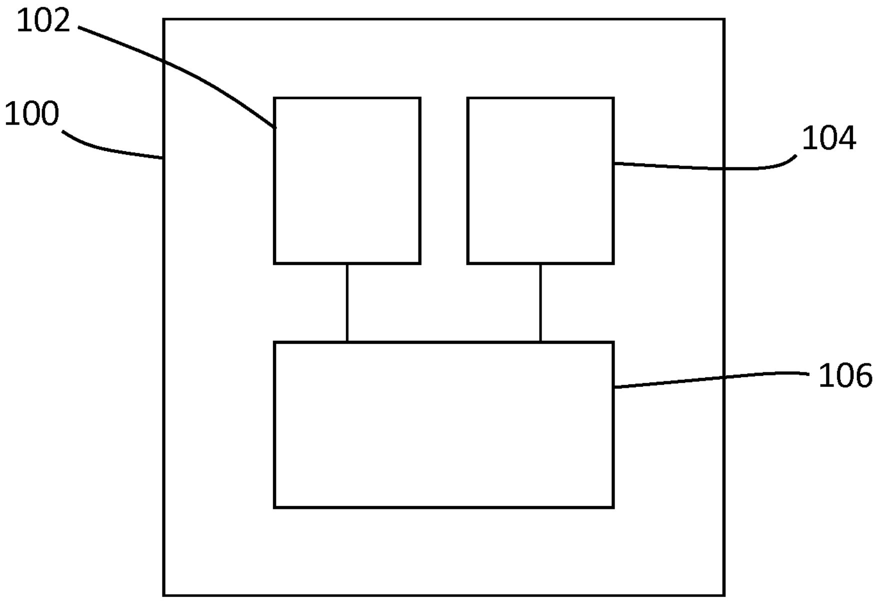
FIG. 1 is a schematic illustration of an example of a personal care device according to embodiments of the invention.

Hairs growing from the human body have properties which vary depending on the part of the body from which they are growing. With knowledge of particular characteristics of hairs from various body parts, it is possible to identify a body part of a user based on data relating to the hairs growing from that body part. Referring to the drawings, FIG. 1 illustrates, schematically, an example of a personal care device 100 in accordance with embodiments of the invention. The personal care device 100 includes a personal care element 102, an imaging device 104 and processing apparatus 106.

The invention may be embodied in any personal care device 100 which is capable of being used to perform a personal care activity on skin of a user. Thus, the personal care device 100 may, for example, comprise a hair removal device, such as an epilator or an intense pulsed light (IPL) device, a hair care device, such as a shaver, clippers, or a hair trimmer, a skin health analysis device, an electric massager, a phototherapy device or a pain relief device. Other personal care devices are also envisaged.

The personal care element 102 is a portion of the personal care device 100 which performs the personal care activity, and it will be appreciated that the nature of the personal care element will depend on the nature of the particular personal care device. For example, in an epilator, the personal care element 102 may comprise a plurality of rotating disks or tweezer elements; in a shaver or hair trimming device, the personal care element may comprise one or more blades for cutting hair; and in a skin health analysis device, the personal care element may comprise an optical pick-up arrangement for analysing the skin.

The imaging device 104 may be selected based on the nature of the personal care device 100. In general, the imaging device 104 may comprise any type of imaging device capable of capturing image data relating to a portion of the user's body to which the personal care activity is being performed. In some embodiments, the imaging device 104 may comprise a device selected from a group comprising, but not limited to: an optical imaging device, a capacitive contact sensor, and an acoustic imaging device. An optical imaging device may include an arrangement having a light source, one or more optical elements for manipulating light from the light source, and an imaging sensor, such as a charge-coupled device (CCD) sensor, for detecting light reflected from a target (i.e. a body of the user). A capacitive contact sensor, or a capacitive displacement sensor, may generate an image of the body of the user based on contact made by the skin and/or hairs with the imaging device. An acoustic imaging device may generate an image of the body of the user using non-ionising laser pulses which are delivered to the body of the user. Ultrasonic waves which are generated by tissue in the body are then detected and analysed to generate an image. It will be appreciated that other imaging modalities (optical and otherwise) may alternatively be used. In some embodiments, multiple imaging modalities or imaging devices may be used to image the body of the user.

The processing apparatus 106 may comprise one or more processors, processing devices and/or computing devices capable of performing processing tasks. The processing apparatus 106 is, in some embodiments, connected to the personal care element 102 and the imaging device 104, and is configured to communicate with one or more of the personal care element and the imaging device. For example, the imaging device 104 may be controlled by the processing apparatus 106 to generate an image of (or image data relating to) a portion of a user's body to be acted upon (e.g. to be treated) by the personal care element 102, and that image or image data may be processed by the processing apparatus. The processing apparatus 106 may also control the operation of the personal care element 102 and, as noted below, the processing apparatus may, in some embodiments, adjust an operating parameter of the personal care element in response to processing performed on the image data.

In some embodiments, as discussed below, processing of image data may be performed by processing apparatus external to the personal care device 100, for example by processing apparatus located remotely, in a computing device.

Figure 2:
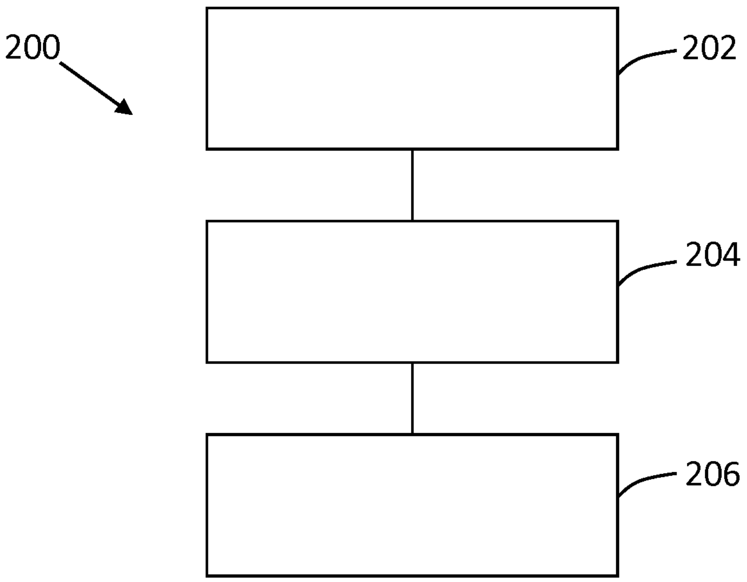
FIG. 2 is a flowchart of an example of a method for operating a personal care device according to embodiments of the invention.

FIG. 2 is a flowchart of an example of a method 200 operating a personal care device, such as the personal care device 100. The method 200 comprises, at step 202, obtaining, using the personal care device 100, image data relating to a portion of a body of a user. The image data may be obtained using the imaging device 104, using one or more of the various imaging modalities mentioned above. It is intended that the image data relates to a relatively small portion of the user's body, for example an area of skin of approximately 5 millimetres (mm) by 5 millimetres. In this way, sufficient image data may be obtained for subsequent processing, but the image captured is unlikely to be large enough for the user to be visually identified from the image. Therefore, the privacy of a user may be maintained.

At step 204, the method 200 comprises measuring, using the image data, a parameter relating to at least one hair growing from the portion of the body. The measuring 204 may be performed by processing apparatus 106 in the personal care device 100 or, as noted above, by a processor located remotely in a different computing device. The measuring 204 may include identifying, within the image data, one or more hairs that are growing out of the skin in the portion of the user's body that has been imaged by the imaging device 104. Once one or more hairs have been identified, one or more parameters of one or more of the hairs are measured. Some properties of hairs can be representative of the body part from which they are growing. Thus, by measuring a parameter of a hair, it may be possible to determine a location of the hair on the body of the user. For example, it may be possible to determine the body part (e.g. forehead, cheek, chin, neck, shoulder, arm, armpit, chest, back, upper leg, lower leg, foot) of the user's body from which the hair is growing. In addition to measuring one or more parameters of a hair itself (e.g. of the hair shaft), the measuring 204 may, in some embodiments, include measuring one or more parameters of a hair follicle, or of an opening in the skin from which the hair has been removed. For example, a measure of surface density of hair in the area of skin imaged by the imaging device 104 may be obtained by measuring the number of hair follicles in a particular area, or the cross sectional area of the openings in the skin from which hairs grow. A measure of the cross sectional area of the openings in the skin may be equivalent to, or approximated by, a measure of the cross sectional area of hair shafts growing from the skin at the point where they emerge from the skin.

As noted above, one or more of a large number of parameters of hair may be measured in accordance with the invention. In some embodiments, the processing apparatus 106 may measure all possible parameters of one or more of the hairs appearing in the image. In other embodiments, the processing apparatus 106 may measure a single parameter, or a subset of parameters, of one or more of the hairs if possible, and may measure one or more additional parameters if required.

An example of a parameter of a hair that may be measured by the processing apparatus 106 is the hair shaft diameter. Hair growing from different parts of the body may have different diameters. For example, a hair growing from the scalp of a human (known as a terminal hair) may have a diameter which is relatively larger than the diameter of hair growing elsewhere on the human body (known as a vellus hair). A terminal hair may have a diameter of around 0.06 mm, while a vellus hair may have a diameter of around 0.03 mm. Since vellus hairs are so small, the imaging device 104 needs to have a resolution great enough to resolve such small hairs.

A further example of a parameter of hair that may be measured, as noted above, is the surface density, or surface coverage, of hair, which can be determined using a measure of the cross sectional area of each hair emerging from the portion of skin in the image, or the cross sectional area of each opening in the skin from which a hair emerges (known as an infundibulum). In making such a measurement, the processing apparatus 106 may assume that the cross section of each opening and/or hair shaft is round. The cross sectional area of the openings, or hairs, may be calculated for a unit area, for example follicle area per centimetre squared (follicle area/$cm^2$).

A further example of a parameter of hair that may be measured according to the invention is a sum of the cross sectional areas of the hairs in the captured image. As noted above, it may be assumed that the cross section of each hair shaft is round. The sum of the areas of all of the hairs may be indicative of a body part from which they are growing.

A further parameter of hair that may be measured according to the invention is the orientation of the hair emerging from the skin. The orientation of each hair may be measured relative to the personal care device 100. Hairs emerging from a human body have a natural orientation relative to the body, depending on the portion of the body (e.g. the body part) from which the hair is growing. Therefore, the orientation of a hair emerging from the user's skin may be indicative of the body part from which the hair is growing. In some embodiments, the personal care device 100 may include components or a device (e.g. an accelerometer) for determining the orientation of the personal care device relative to the body of the user and/or relative to a fixed point (e.g. on Earth). Information from the accelerometer may be used to determine the orientation of the hairs relative to the user's body and/or relative to Earth.

A further example of a parameter of hair that may be measured in accordance with the invention is the uniformity of the orientation, or the angular distribution, of hairs in the image. Hairs growing from the skin at some parts of the human tend to grow in generally the same direction (i.e. relatively uniformly). However, hairs growing from the skin at other parts of the human body tend to have a greater angular distribution and, therefore, less uniformity in their orientation.

A further example of a parameter of hair that may be measured in accordance with the invention is a pigment of the hair. Hairs growing from some parts of the human body tend to have a particular pigment, or a relatively large difference from the pigment growing from other parts of the human body. For example, male facial hair (e.g. beard hair) had a large pigmentation difference from hair growing elsewhere on a male human body. Similarly, hair growing from a human leg tends to have a darker pigment than hair growing from other parts of the human body.

It will be appreciated that hair parameters other than those discussed above may additionally or alternatively be measured in accordance with the invention.

Once a measurement of a least one parameter of at least one hair has been made, the method further comprises, at step 206, determining a position on the body of the portion of the body from which the image data is obtained, based on the measured parameter and a predetermined relation between the parameter and the position on the body. The determination of the position of said portion of the body on the body may be a determination of a body part wherein said portion of the body is present, and in such an embodiment said predetermined relation may be a predetermined relation between the parameter and specific parts of the body. Said determination of the position of the portion of the body on the body may be made by comparing the measured parameter with one or more look-up tables or databases in which said predetermined relation is stored. A look-up table and/or a database may be stored in a storage medium, such as a memory unit, which may form part of the personal care device 100, or may be located remotely and accessible by the processing apparatus 106. In some embodiments, one or more look-up tables may comprise generic, or universal, look up tables, which include generic data based on hair parameters of an average human being, or an average male or female human being. In some embodiments, the look-up tables may be compiled, adjusted or updated, and/or databases may be populated based on information acquired from a particular user as is discussed below.

Figure 3:
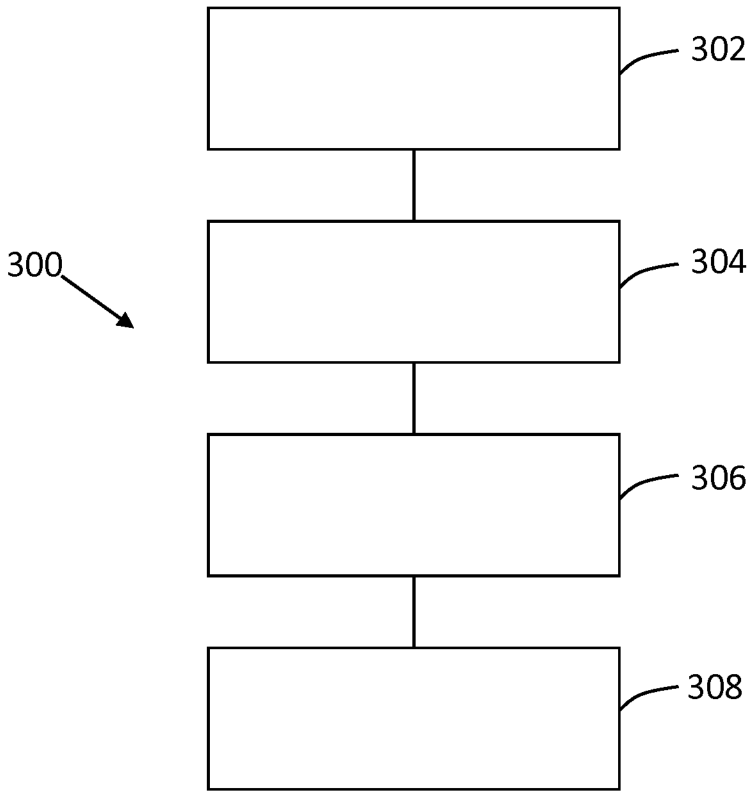
FIG. 3 is a flowchart of a further example of a method for operating a personal care device according to embodiments of the invention.

FIG. 3 is a flow chart of an example of a method 300 for operating a personal care device, such as the personal care device 100. The method 300 includes, at stage 302, performing a personal care activity to the body of the user. The particular personal care activity to be performed using the personal care device 100 at step 302 depends on the nature of the personal care element 102. In some embodiments, the steps 202, 204 and 206 may be performed while the personal care device 100 is being used to perform the personal care activity (step 302).

At step 304, the method 300 further comprises, responsive to determining the position on the body of the portion of the body from which the image data is obtained, causing the personal care device to perform an action. Once the position of the portion of the body on the body has been identified at step 206 one or more actions may be performed by the personal care device 100 based on the identification.

In some embodiments, an action performed by the personal care device 100 may include indicating to the user the position on the body of the portion of the body from which the image data is obtained, for example indicating to the user the determined body part or the nature of the determined body part. In some embodiments, the indication to the user may be made visually, using, for example, a series of light elements (e.g. LEDs) arranged in the shape of a human body, or arranged on a diagram of the human body on the personal care device 100, by illuminating a particular lighting element which corresponds to the identified body part. In some embodiments, a visual indication may be made to the user by displaying on a display screen of the personal care device 100 or on another computing device, a textual or pictorial indication of the identified body part. In yet further embodiments, an audible indication may be provided to the user. For example, the processing apparatus 106 may generate a spoken indication of the identified body part which may be presented to the user via a speaker in the personal care device 100 or in another computing device.

In some embodiments, the action performed in response to determining the position on the body, e.g. determining the body part (step 304), may include adjusting an operating parameter of the personal care device 100 based on the determined position on the body or the determined body part. The personal care element 102 of the personal care device 100 may be caused to operate in accordance with one or more operating parameters which may depend on the nature of the personal care element, and/or on the nature of the user (e.g. male or female). However, the personal care element 102 may be caused to operate in accordance with one or more parameters which can be adjusted or tailored depending on the position on the body or the body part on which the personal care activity is being performed. For example, in an embodiment in which the personal care element 102 comprises a hair removal element, such as a photo-epilation element, an intensity and/or a wavelength of radiation to be emitted by the personal care element 102 may depend upon the type of hair to be treated and, therefore, on the body part from which the hair is growing. The treatment of relatively thick hair may require a greater intensity than relatively thin hair, for example. Similarly, a relatively greater intensity of light may be applied to a hair growing deeper in the skin of the body of the user than to a hair which is growing shallower in the skin. Thus, the processing apparatus 106 may adjust one or more parameters of the personal care element 102 based on the determination of the position on the body or the body part to be treated.

In some embodiments, one or more optimum settings or parameters may be stored (for example in a storage unit of the personal care device 100) which correspond to the various body parts. Thus, when a particular body part is identified in step 206, the processing apparatus 106 may automatically adjust the operating parameters of the personal care element 102 to suit the identified body part, such that the personal care activity is performed in an optimised manner. In other embodiments, a user may manually adjust one or more parameters based on the identified body part.

At step 306, the method 300 may further comprise storing at least one of the image data, the measured parameter and the determined body part in a storage device. By storing the data acquired by the personal care device 100, the data may be used at a later time, or for an alternative purpose. For example, the stored data may be used to generate a log or a record of the locations on the user's body where the personal care activity has been performed. Such information may be used to provide an indication to the user of parts of his or her body that have not yet been treated, or portions of his or her body to which the personal care activity has been performed too many times. In this way, the personal care device 100 may provide feedback in real time and/or subsequently to the user regarding a quality of the user's performance of the personal care activity.

The method 300 may further comprise, at step 308, transmitting at least one of the image data, the measured parameter and the determined position on the body of the portion of the body from which the image data is obtained to a computing device. In other words, at least some of the data acquired by the personal care device 100 may be transmitted, for example via a wired or wireless connection, to a connected or remote computing device. The transmitted data may be used for further analysis, for example by user or by a third party. The data may, in some embodiments, be translated to a medical professional, particularly if the personal care activity involves monitoring or measuring a parameter of the user's skin. Additionally or alternatively, the transmitted data may be delivered to a manufacturer of the personal care device 100 to enable the manufacturer to determine the extent to which the personal care device is used on different parts of the body and/or to enable the manufacturer to track the usage of the device so that the user may be informed when the personal care element 102 is due to be replaced, for example.

Figure 4:
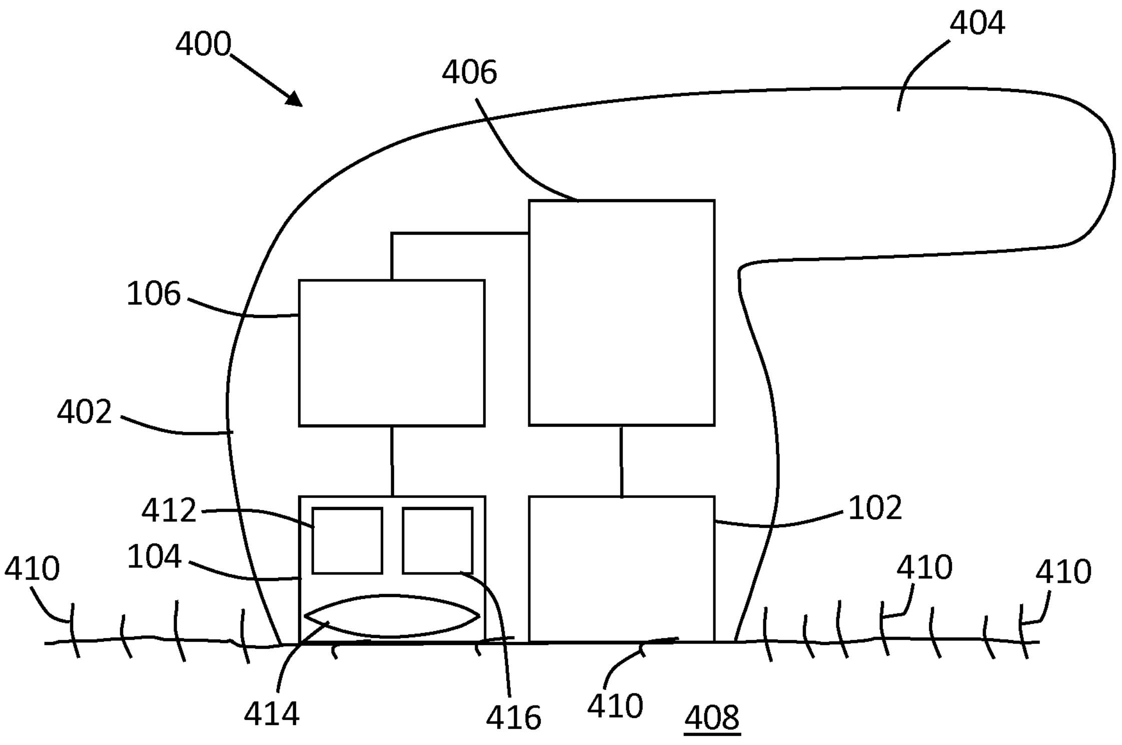
FIG. 4 is a schematic illustration of a further example of a personal care device according to embodiments of the invention.

As will be appreciated, the personal care device 100 may be any type of personal care device suitable for use in performing a personal care activity on the surface (i.e. the skin of a body of a user). One particular example embodiment of such a personal care device 400 will now be discussed with reference to FIG. 4. FIG. 4 shows a personal care device 400 having a body portion 402 and a handle portion 404. The personal care device 400 may be the same as the personal care device 100 discussed above. The body portion 402 is configured to house components and circuitry of the device, and the handle portion 404 provides a means by which a user can hold the device 400 during use. The personal care device 400 includes the personal care element 102, the imaging device 104 and the processing apparatus 106. In the embodiment shown in FIG. 4, the personal care device 400 also includes a control unit 406 which is configured to control an operation of the personal care element 102. However, it will be appreciated that, in some embodiments, the control unit 406 may form part of the processing apparatus 106. In other embodiments, as discussed below with reference to FIG. 5, the personal care device 100, 400 may include the control unit 406, but not the processing apparatus 106.

The personal care device 400 is shown, in FIG. 4, to be in contact with a surface (i.e. skin) 408 of the body of a user and hairs 410 are shown to be extending from the skin. While, in this embodiment, the personal care device 400 is in contact with the skin 408, in other embodiments, a separator element formed, for example, on a bottom surface of the person care device, may prevent the body portion 402 from contacting the skin such that the personal care device is spaced apart from the skin during use.

In this embodiment, the imaging device 104 is an optical imaging device, which includes an illumination source 412, one or more optical elements 414, and a sensor or detector 416. The illumination source 412 may include one or more light emitting diodes (LEDs) for illuminating a portion of the skin 408 to be imaged. The one or more optical elements 414 may serve to focus or direct light from the illumination source 412 or light reflected from the skin 408. The optical elements 414 may include one or more lenses such as a singlet lens. The sensor 416 is configured to receive light reflected from the skin 408, and, in this embodiment, comprises a charge-coupled device (CCD) sensor. It will be appreciated that, in other embodiments, the sensor 416 may comprise a different type of sensor, such as a conductive contact sensor or an acoustic detection sensor. However, in general, the sensor 416 should be capable of detecting and imaging objects (i.e. hairs) to a desired resolution. In general, a field of view of the imaging device 104 may be approximately 25 $mm^2$ (e.g. 5 mm×5 mm) and, in some embodiments may be larger, for example approximately 100 $mm^2$ (e.g. 10 mm×10 mm). An image resolution of the imaging device 104 may, in some embodiments, be up to 3 micrometres per pixel (μm/pixel) and, in other embodiments, may be lower, for example, 2 μm/pixel. The imaging device 104 may, in some embodiments, have an image pixel dimension of at least 1,000 pixels×1,000 pixels (i.e. 1 megapixel (MP)), and in other embodiments, the imaging device may have an image pixel dimension of, for example, 5 megapixels or 10 megapixels. It will be understood that the parameters of the imaging device 104 need only be sufficient to resolve hairs emerging from skin of a user which, typically, have a minimum diameter of around 15 μm.

In use, a user may hold the handle 404 of the personal care device 400, and position the personal care device on a portion of his or her body (e.g. a thigh). The user may operate the device 400 to perform a personal care activity (e.g. photo-epilation), for example by pressing an "on" or "start" button (not shown). During operation the processing apparatus 106 or the control unit 406 may cause the personal care element 102 to perform the desired personal care activity (in this case photo-epilation) on the hairs 410 growing from the skin 408 of the user. During operation of the personal care element 102, the processing apparatus 106 or the control unit 406 may cause the imaging device 104 to obtain image data from the portion of the skin 408 being treated, or the portion of skin adjacent to the portion being treated. Image data acquired by the imaging device 104 may be delivered to the processing apparatus 106 to be analysed. Specifically, a parameter of at least one hair 410 for which image data has been acquired may be measured by the processing apparatus 106. The processing apparatus 106 may then consult a look-up table, which may be stored within the personal care device 100, 400, and a determination may then be made as to the body part from which the hairs 410 are growing (in this case, the thigh of the user). The image data acquired by the imaging device 104, the measured hair parameter and/or the determined body part may then be stored a memory. Additionally, or alternatively, based on the determined body part, the processing apparatus 106 may optimize or at least improve, performance of the personal care activity by adjusting one or more operating parameters of the personal care element 102, such as a radiation intensity.

The look-up tables may include generic data relating to parameters of hairs rightly to be found on the particular body parts of a human, based on average, or documented data. However, a more accurate optimisation of a personal care device 100, 400 may be achieved by obtaining user-specific data relating the parameters of hairs to different parts of a particular user's body. This may be achieved, in some embodiments, by acquiring image data from the various parts of a user's body before operation of the personal care element 102. For example, a user may operate the personal care device 100, 400 in a so-called "calibration" mode or "mapping mode" in which the imaging device 104 is operated by the processing apparatus 106, but the personal care element 102 is not operated. During such an operational mode, the imaging device 104 of the personal care device 100, 400 may be configured to capture a series of images (or sets of image data) from various body parts of the user, as the user moves the device over his or her body. For each body part, the processing apparatus 106 may calculate an average value for each hair parameter that may be measured, over the series of images for that body part. The average value for each parameter for a particular body part may then be stored in a memory unit, and used as a look-up table for that particular user, the next time that device is used.

In some embodiments, the personal care device 100, 400 may indicate to the user, for example using a display device or display screen, an area or portion of his or her body to which the device 100, 400 should be moved to obtain the next set of images. Once images have been obtained from a sufficient number of body parts (which may be determined by the device or by the user), the user may put the device 100, 400 into a so-called 'treatment mode', such that the imaging device 104 no longer acquires image data, but the processing apparatus 106 operates the personal care element 102.

Figure 5:
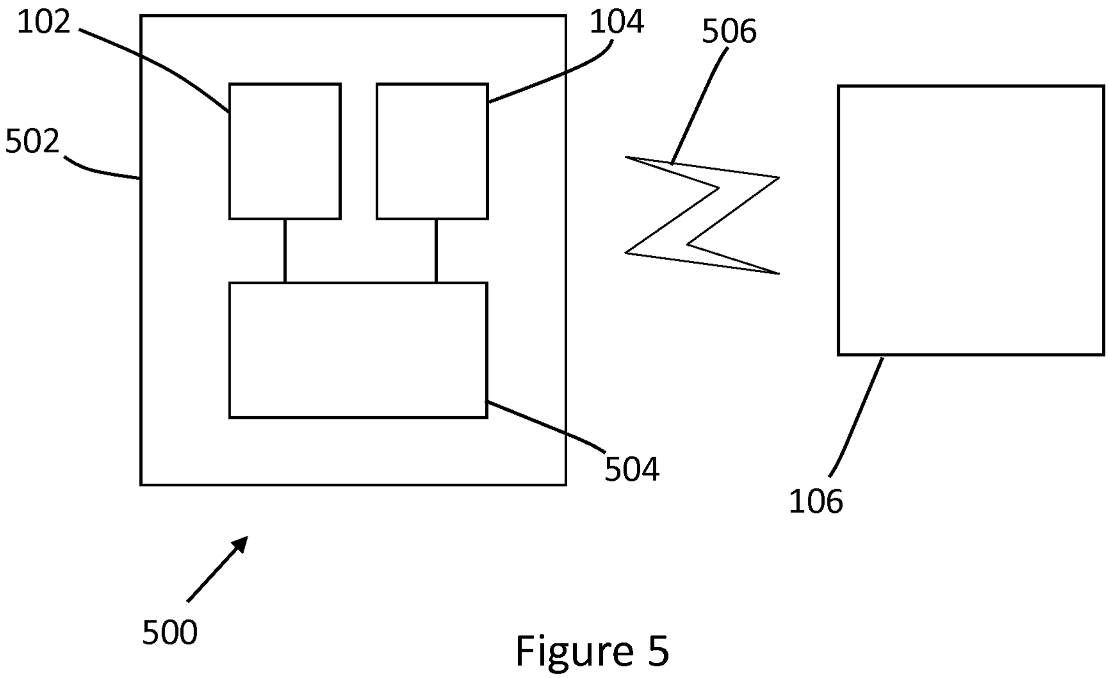
FIG. 5 is schematic illustration of an example of a personal care system according to embodiments of the invention.

While, in some embodiments, the processing apparatus 106 configured to measure the hair parameter from the acquired image data is located within the personal care device 100, 400, in other embodiments, the processing may be performed by a processing apparatus located externally from the personal care device. An example of such an embodiment is shown in FIG. 5. FIG. 5 shows a personal care system 500 comprising a personal care device 502 and a processing unit 106. The personal care device 502 is similar to the processing devices 100, 400 in that it includes a personal care element 102 and an imaging device 104 for obtaining image data relating to a portion of a body of a user. However, the personal care device 502 does not include the processing apparatus 106. Rather, the personal care device 502 includes a controller 504, which may be similar to the controller 406 discussed above. The controller is configured to control the personal care element 102 and imaging device 104. In this embodiment, the processing apparatus 106 may comprise a processing unit of a remote computing device, such as a smartphone or tablet computer, for example. Signals may be transmitted between the personal care device 502 and the processing apparatus 106 via transmission means 506, which may be a wired or wireless connection. Using the system 500, a user may operate the personal care device 502 to perform a personal care activity and to acquire image data from his or her skin, and a smartphone or tablet computer, for example may be used to perform the processing of the image data and the measurement of hair parameters. The smartphone or tablet computer may also be used to present information to the user and to transmit control instructions to the control unit 504 of the personal care device 502 in response to the determination of the body part to be treated.

Figure 6:
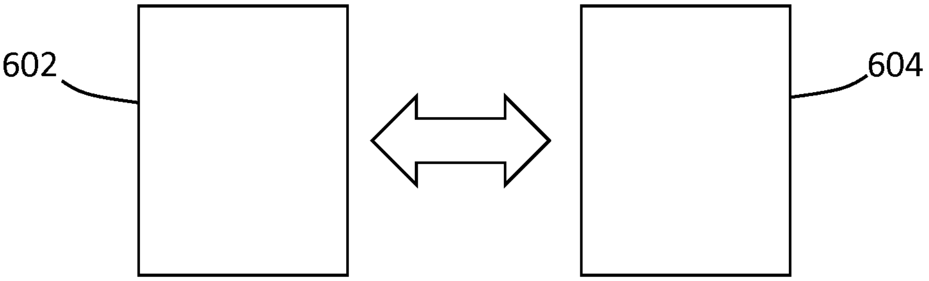
FIG. 6 is a schematic of an example machine-readable medium with a processor.

A further aspect of the invention relates to a machine-readable medium which may comprises instructions which, when executed by a processor or processing apparatus, cause the processor or processing apparatus to perform the methods disclosed herein. FIG. 6 shows an example of a machine readable medium 602 with a processor 604, which may be similar to the processing apparatus 106. The machine-readable medium 602 comprises instructions which, when executed by the processor 604, cause the processor to obtain image data relating to a portion of a body of a user; measure, using the image data, a parameter relating to at least one hair growing from the portion of the body; and determine a position of the portion of the body on the body based on the measured parameter and a predetermined relation between the parameter and the position on the body.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

The invention claimed is:

1. A method for identifying a body part of a user while operating a personal care device, the method comprising:

obtaining, using an imaging device, image data relating to at least a portion of the body part to be treated by the personal care device;

measuring, using the image data, a parameter relating to at least one hair growing from the at least a portion of the body part;

identifying, using the personal care device, a location on the body part based on a comparison of the measured parameter and a predetermined relation between the parameter and the body part;

automatically adjusting, via the personal care device, an operating parameter of the personal care device based on the measured parameter relating to the at least one hair, and performing a personal care activity on the location on the body part using the personal care device based on the automatically adjusted operating parameter of the personal care device.

2. The method according to claim 1, further comprising:

responsive to identifying the body part, causing the personal care device to perform an action.

3. The method according to claim 2, wherein the action comprises:

indicating, to the user, the identified body part determined position of the portion of the body on the body.

4. The method according to claim 3, wherein the indication is visual or audible, wherein a visual indication is made to the user by displaying a textual or pictorial indication of the identified body part on a display screen of the personal care device.

5. A method according to claim 1, wherein said parameter comprises at least one of: a diameter of a shaft of the at least one hair, an orientation of the at least one hair relative to the body of the user, a pigment of the at least one hair.

6. A method according to claim 1, comprising measuring the parameter for a plurality of hairs, wherein said parameter comprises at least one of: an area of the portion of the body to which the image data relates which is covered by the plurality of hairs, a sum of cross section areas of shafts of the plurality of hairs growing from the portion of the body, and a degree of uniformity of an orientation of the plurality of hairs relative to the portion of the body.

7. A method according to claim 1, wherein said predetermined relation is stored in a lookup table or database.

8. A method according to claim 1, further comprising:
storing at least one of the image data, the measured parameter and the determined position of the portion of the body on the body in a storage device.

9. A method according to claim 1, further comprising:
transmitting at least one of the image data, the measured parameter and the determined position of the portion of the body on the body to a computing device.

10. The method according to claim 1, further comprising prompting the user to adjust an operating parameter of the personal care device based on the identified body part.

11. A personal care device comprising:
a personal care element;
an imaging device; and
a processing apparatus configured to:
obtain, using the imaging device, image data relating to at least a portion of a body part of a user to be treated by the personal care device;
measure, using the image data, a parameter relating to at least one hair growing from the at least a portion of the body part;
identify a location on the body part based on a comparison of the measured parameter and a predetermined relation between the parameter and the body part; and
automatically adjust an operating parameter of the personal care device on the location of the body part based on the measured parameter relating to the at least one hair.

12. The personal care device according to claim 11, wherein the imaging device comprises a device selected from a group comprising: an optical imaging device; a capacitive contact sensor; and an acoustic imaging device.

13. The personal care device according to claim 11, wherein the processing apparatus is remote or connected to the personal care element and the imaging device.

14. A personal care system comprising:
a personal care device comprising:
a personal care element;
an imaging device configured to obtain image data relating to at least a portion of a body part of a user to be treated by the personal care element;
a controller configured to control the personal care element and the imaging device;
a processing apparatus, remote from the personal care device, configured to:
measure, using the image data, a parameter relating to at least one hair growing from the at least a portion of the body part;
identify a location on the body part based on a comparison of the measured parameter and a predetermined relation between the parameter and the body part; and
automatically adjust an operating parameter of the personal care device on the location on the body part based on the measured parameter relating to the at least one hair.

15. The personal care system according to claim 14, wherein the controller is configured to:
responsive to identifying the body part, control the personal care device to indicate to the user the identity of the body part.

* * * * *